United States Patent [19]

Patsiokas et al.

[11] Patent Number: 5,020,136
[45] Date of Patent: May 28, 1991

[54] BATTERY PACK ANTENNA SUITABLE FOR USE WITH TWO-WAY PORTABLE TRANSCEIVERS

[75] Inventors: Stelios J. Patsiokas, Hollywood; Oscar M. Garay, North Lauderdale; Quirino Balzano, Plantation, all of Fla.

[73] Assignee: Motorola, Inc., Schaumburg, Ill.

[21] Appl. No.: 465,571

[22] Filed: Jan. 18, 1990

Related U.S. Application Data

[63] Continuation of Ser. No. 854,218, Apr. 21, 1986, abandoned, which is a continuation-in-part of Ser. No. 596,800, Apr. 4, 1984, abandoned.

[51] Int. Cl.⁵ .............................................. H04B 1/08
[52] U.S. Cl. ...................................... 455/89; 455/351; 455/348; 455/349; 455/272
[58] Field of Search ................... 455/89, 127, 90, 128, 455/129, 272, 274, 349, 351, 347, 348; 429/1; 343/702

[56] References Cited

U.S. PATENT DOCUMENTS

| | | | |
|---|---|---|---|
| 3,184,746 | 5/1965 | Chatelain | 343/742 |
| 4,034,164 | 7/1977 | Westmoland | 455/89 |
| 4,123,756 | 10/1978 | Nagata et al. | 455/347 |
| 4,214,197 | 6/1980 | Mann et al. | 455/89 |
| 4,584,709 | 4/1986 | Kneisel et al. | 455/89 |
| 4,593,409 | 6/1986 | Miller | 455/349 |
| 4,641,366 | 2/1987 | Yokoyama et al. | 455/90 |
| 4,648,125 | 3/1987 | Brown | 455/90 |
| 4,672,685 | 6/1987 | Phillips et al. | 455/90 |

Primary Examiner—Douglas W. Olms
Assistant Examiner—Ralph Smith
Attorney, Agent, or Firm—Juliana Agon

[57] ABSTRACT

A combination battery pack and low profile antenna arrangement for use in conjunction with a two-way portable transceiver includes an enclosure containing an electrical battery with positive and negative electrodes. A pair of terminals are attached to the outer surface of the enclosure and are coupled to the positive and negative electrodes. A low profile antenna structure is disposed within the enclosure and includes a feed point for coupling RF energy to and from the antenna structure. An antenna coupling arrangement is electrically coupled to the feed point for coupling RF energy into and out of the enclosure.

14 Claims, 4 Drawing Sheets

— PRIOR ART —

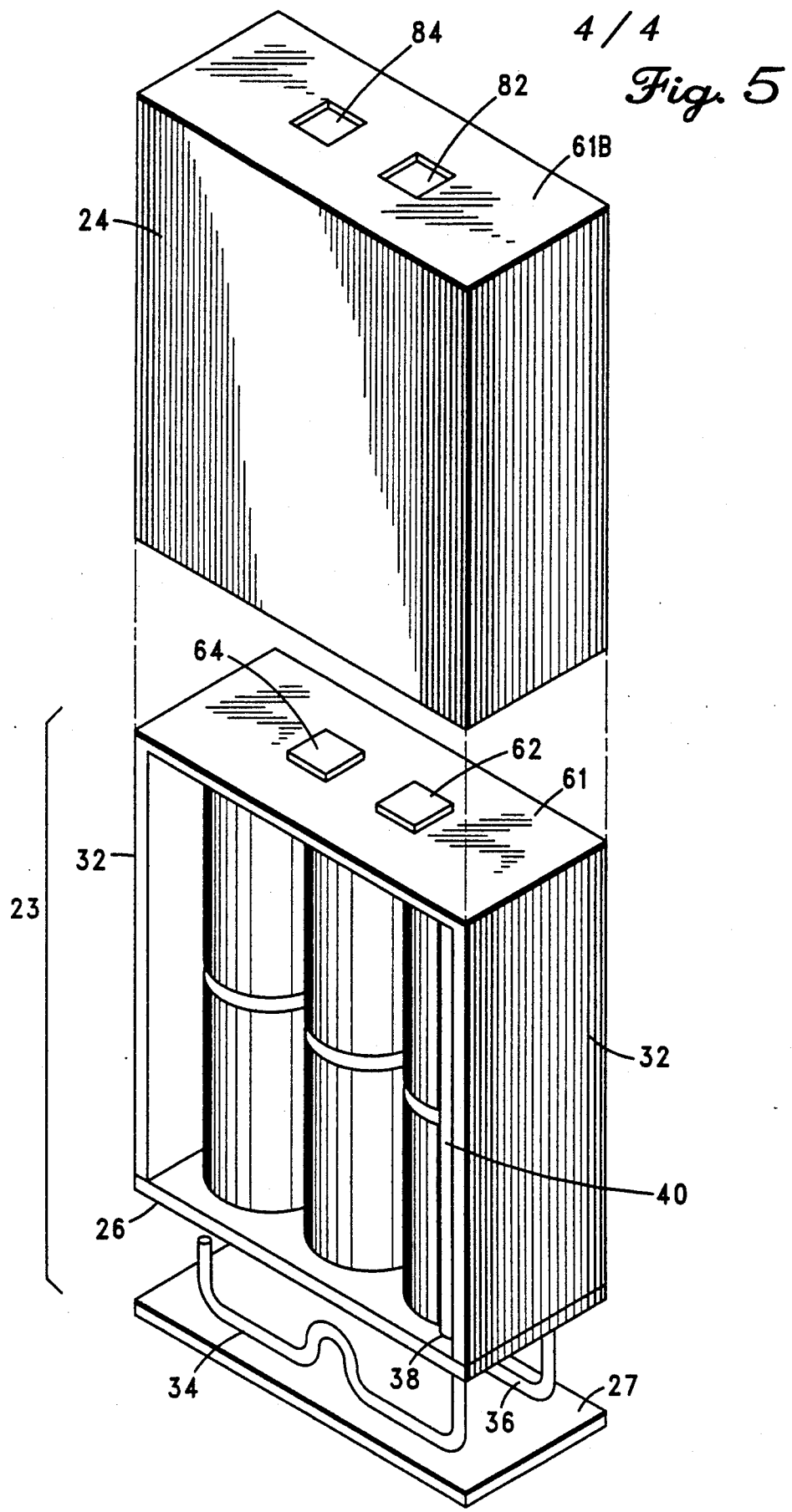

BATTERY PACK ANTENNA SUITABLE FOR USE WITH TWO-WAY PORTABLE TRANSCEIVERS

This application is a continuation of application No. 06/854,218 filed Apr. 21, 1986 and now abandoned, which is a continuation-in-part of application Ser. No. 596,800, filed Apr. 4, 1984, now abandoned.

BACKGROUND OF THE INVENTION

1. Field of the Invention

This invention relates generally to the field of antenna structures for two-way portable transceivers. More particularly, this invention relates to low profile antenna structures suitable for packaging within the battery enclosure of a portable two-way transceiver.

2. Background

One antenna which is useable in the present invention is described and claimed in the copending U.S. patent application of Stelios J. Patsiokas entitled "Low Profile Antenna Suitable For Use With Two-Way Portable Transceivers", Ser. No. 596,862, filed Apr. 4, 1984, now U.S. Pat. No. 4,571,863 and assigned to Motorola, Inc., the assignee of the present invention. Such patent application, Ser. No. 596,862, is hereby incorporated by reference and made a part hereof as if fully disclosed herein.

A conventional portable two-way transceiver is depicted generally as transceiver 10 in FIG. 1. An exemplary transceiver is the 800 MHz MX-300 series of radios manufactured by Motorola, Inc., the Assignee of the present invention. Such transceivers normally include an external antenna 12 attached to the uppermost portion of transceiver 10. The electronic circuitry which makes up the transmitter and receiver is normally housed primarily in a housing 14. A battery pack 16 typically attaches to the bottom portion of housing 14. This battery pack normally encloses one or more electrical battery cells along with associated decoupling components and circuitry necessary to effect and control charging of the battery cells.

Transceiver 10 is shown to have an overall height of L1 made up of the height of the antenna shown as L2, the height of the housing shown as L3 and the height of the battery pack shown as L4. For a typical model of the MX-300 series transceiver, the overall height L1 is approximately 15.4 inches, L2 is approximately 7.7 inches, L3 is approximately 4.1 inches, and L4 is approximately 3.6 inches.

The present invention allows for elimination of the conventional top-mounted antenna 12 and provides for a highly efficient radiating structure which may be placed within the battery pack. The resulting configuration is shown in FIG. 2 generally as transceiver 20. By utilizing the present invention the overall height may be significantly reduced. The resulting transceiver 20 has an overall height shown as L5 made u of the height of transceiver housing 14 which remains unchanged and the slightly increased height of the battery pack/antenna 22 shown as L6. In one embodiment of the present invention, height L6 is only 4.6 inches resulting in an overall height L5 of 8.7 inches without sacrifice of battery capacity. This is an overall reduction in height of 6.7 inches. Of course, further height reductions are possible if battery life is not a prime consideration. This height reduction is possible without significant compromise of antenna performance.

While the specific antenna configuration disclosed herein may be utilized in locations other than a battery housing, a number of important advantages are attained by placing the antenna in the battery compartment. The electrical battery cells provide an excellent counterpoise for operation of the antenna structure and help shield radiation from sensitive radio components. In addition, the antenna is well protected and less likely to be damaged when enclosed within the battery pack. Also, by removing the antenna from the upper surface of transceiver housing 14, more vital space for transceiver controls is free. This aspect is becoming increasingly important as the level of complexity of two-way portable transceivers rapidly increases.

SUMMARY OF THE INVENTION

It is an object of the present invention to provide an improved antenna structure.

It is another object of the present invention to provide an improved low profile antenna structure suitable for use inside the battery pack of a two-way portable transceiver.

It is another object of the present invention to provide a vertically polarized high efficiency antenna structure suitable for replacing conventional sleeve dipole antenna in portable two-way transceivers.

It is yet another object of the present invention to provide an improved antenna arrangement for reducing the overall height of portable two-way transceivers.

It is a further object of the present invention to provide a battery pack/antenna.

These and other objects of the present invention will become apparent to those skilled in the ar upon consideration of the following description of the invention.

In one embodiment of the present invention a combination battery pack and low profile antenna arrangement for use in conjunction with a two-way portable transceiver includes an enclosure having an inner and an outer surface. An electrical battery is disposed within the enclosure and has positive and negative electrodes. A first terminal is attached to the outer surface of the enclosure and is electrically coupled to the positive electrode. A second terminal is attached to the outer surface of the enclosure and is electrically coupled to the negative electrode of the electrical battery. A low profile antenna structure is disposed within the enclosure. The antenna structure includes a feed point for coupling radio frequency energy to and from the antenna structure. An antenna coupling arrangement is electrically coupled to the feed point for coupling radio frequency energy into and out of the enclosure.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

BRIEF DESCRIPTION OF THE DRAWINGS

FIG. 5 is an exploded view of the antenna/battery structure of the invention and the enclosure for the same.

DESCRIPTION OF THE PREFERRED EMBODIMENT

Figure 1:
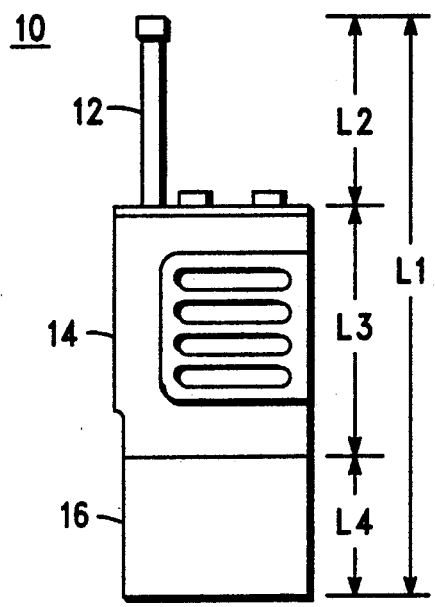
FIG. 1 shows a conventional two-way portable transceiver having a top mounted antenna structure.
Figure 2:
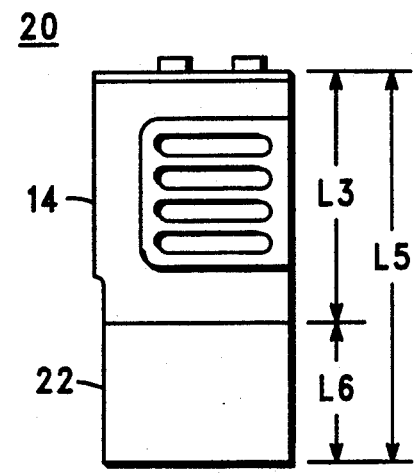
FIG. 2 shows a two-way portable transceiver incorporating the present invention.
Figure 3B:
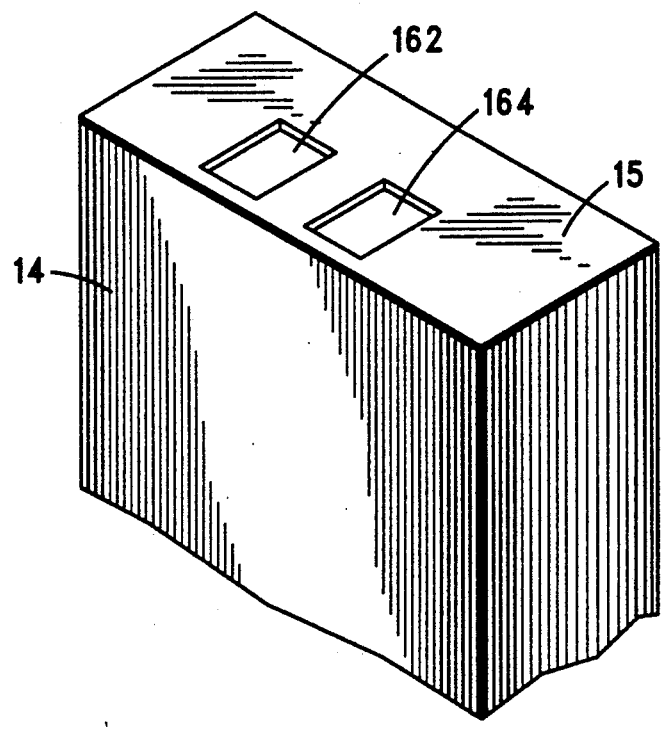
FIG. 3b shows a close-up view of the electrical contacts situated on the portable transceiver which attaches to the battery/antenna structure of the invention.
Figure 3A:
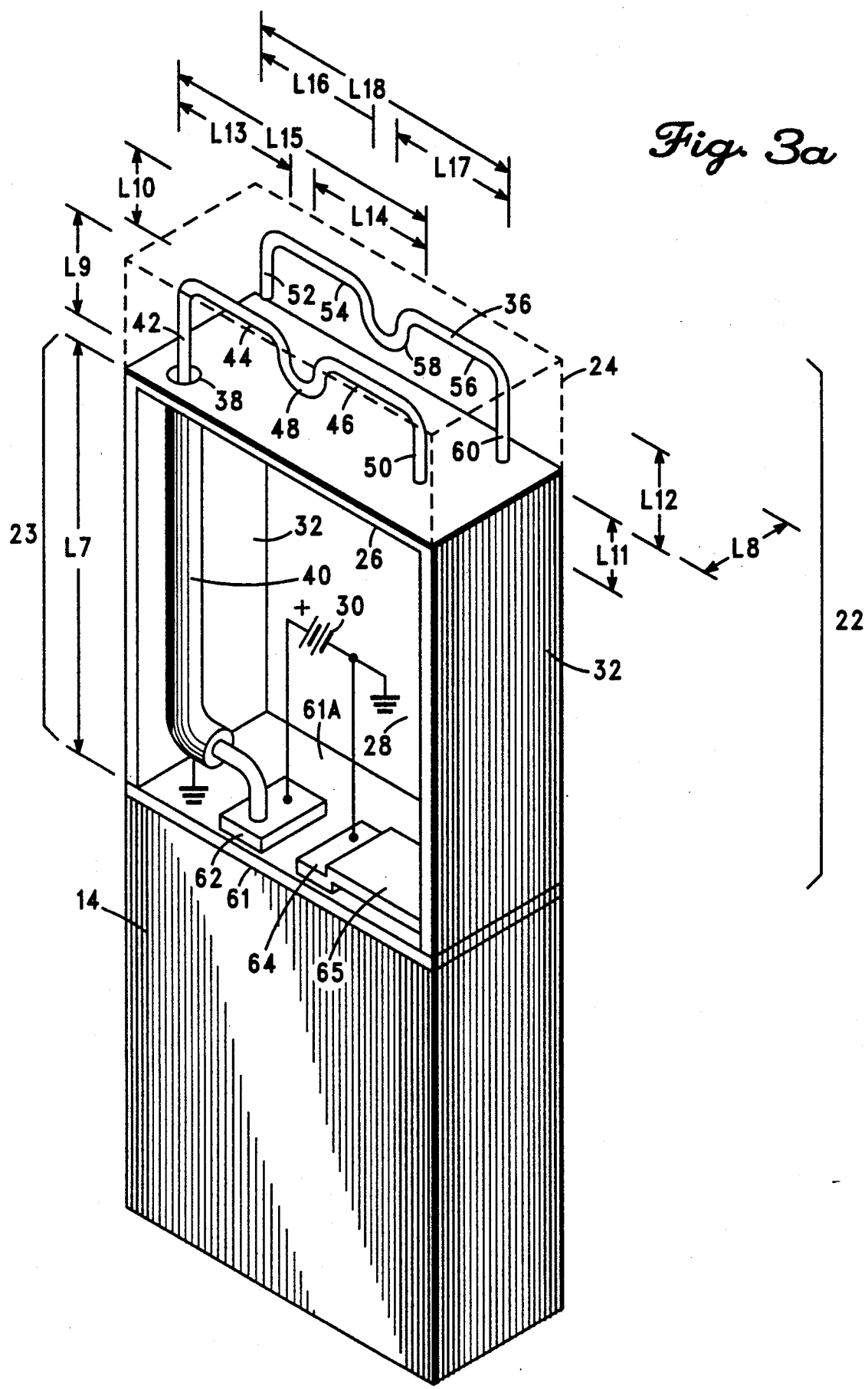
FIG. 3a shows a detailed drawing of the antenna structure of the present invention incorporated within a battery pack and attached to a portable transceiver.

Turning now to FIG. 3a, the vertically polarized, low profile antenna structure of the preferred embodiment of the present invention is shown and generally referred to as battery pack/antenna 22. Battery pack/antenna 22 is shown to be attached to a portable transceiver 14. Battery pack/antenna 22 is also shown inverted relative to its position in FIG. 2 to enhance clarity. Due to the antenna's vertical polarization, it may be utilized either as shown in FIG. 2 or inverted similar to FIG. 3 with equivalent performance. For convenience of description, FIG. 3 will hereinafter be considered to be upright even though it is upside down as used in the preferred embodiment.

A battery enclosure 24, discussed later in more detail, substantially surrounds battery pack/antenna 22. A substantially planar conductive sheet 26 is disposed horizontally within enclosure 24 and separates the main antenna structure from a battery compartment 28. Broken lines are used in FIG. 3a to represent the portion of enclosure 24 which is above sheet 26. The portion of enclosure 2 which is below sheet 26 is not shown in FIG. 3a such that structures within battery compartment 28 may be seen. Battery compartment 28 is used to contain one or more electrical battery cells 30 shown schematically in FIG. 3a. One skilled in the art will recognize that most antenna structures perform best when disposed above (or below) an extensive ground plane. This has created severe problems in the design of prior art antenna structures for use in portable two-way transceivers since an extensive ground plane is virtually impossible to create in a small hand held transceiver. The present invention, however, partially overcomes this difficulty by utilizing the electrical battery cells as a portion of the antenna's counterpoise. This is about th best ground plane possible in a two-way portable transceiver environment.

A vertical conductive member 32 is attached to each end of conductive sheet 26 and extends downward at approximately a normal angle to form a substantially U-shaped geometry. The length of conductive member 32 is labeled L7 in FIG. 3a. This length is not critical, but if L7 is set at approximately one quarter wavelength the antenna performance is enhanced. While the preferred embodiment shows a conductive member 32 at each end of conductive sheet 26 this is not to be limiting as one or more such conductive members may be effectively utilized in the present antenna configuration.

The main antenna structure is disposed above conductive sheet 26 and is made up of a driven radiating element 34 and a parasitic element 36. Driven element 34 is driven at a feed point 38 which may be coupled directly to a 50 ohm transmission line 40. Transmission line 40 is a coaxial transmission line in the preferred embodiment, but stripline, twinlead, etc. may also be suitable in many situations. Also, in the preferred embodiment 50 ohm line is suitable, but other situations may dictate a different characteristic impedance.

Driven radiating element 34 is made up of a first vertical portion 42 attached at a right angle to a first horizontal portion 44. A second horizontal portion 46 is attached to th first horizontal portion 44 with a bent portion 48 in between. Horizontal portion 46 is attached to a second vertical portion 50 which is not attached to conductive sheet 26.

The parasitic radiating element 36 is shaped similarly to the driven element 34. It is made up of a third vertical portion 52 attached to a third horizontal portion 54 which is attached to a fourth horizontal portion 56 through a second bent portion 58. A fourth vertical portion 60 is attached to fourth horizontal portion 56 at a right angle and is conductively attached to sheet member 26 at its free end. The free end of vertical member 52 is free and unattached to conductive sheet 26.

Driven element 34 and parasitic element 36 are disposed substantially parallel to one another above conductive sheet 26 separated by a distance designated L8 in FIG. 3. This distance as well as other critical distances of the antenna structure are designated as L8 through L18 in FIG. 3. For an antenna operable in the 800 to 900 Mhz frequency band, the dimensions L7 through L18 are tabulated in Table 1. These dimensions are, of course, presented only by way of example and are not to be limiting. Those skilled in the art will recognize that these dimensions may be empirically or otherwise modified to obtain modified operational parameters.

TABLE 1

| | |
|---|---|
| L7 | 4.00 Inches |
| L8 | 0.70 Inches |
| L9 | 0.60 Inches |
| L10 | 0.50 Inches |
| L11 | 0.65 Inches |
| L12 | 0.60 Inches |
| L13 | 0.95 Inches |
| L14 | 1.15 Inches |
| L15 | 2.40 Inches |
| L16 | 1.00 Inches |
| L17 | 0.95 Inches |
| L18 | 2.15 Inches |

In order to feed radio frequency energy to and from the present antenna structure, a mechanism may be provided to couple energy into and out of battery enclosure 24. Those skilled in the art will recognize various ways to accomplish this. A separate antenna terminal may be provided or other mechanisms may be devised.

In the preferred embodiment, electrical battery 30 has its positive electrode connected to a positive terminal 62 and has its negative electrode connected to a negative terminal 64. Terminals 62 and 64 are both situated on a sheet of insulative material 61 which extends between the lower ends of sheets 32 as shown in FIG. 3a. Sheet 61 includes opposed major surfaces 61A and 61B of which interior surface 61A is depicted in FIG. 3a and exterior surface 61B is depicted later in FIG. 5. It is noted that electrical contacts 62 and 64 extend from surface 61A through insulative sheet 61 to and above surface 61B as seen in FIG. 3a and FIG. 5.

The negative contact terminal 64 may serve as a transceiver ground point and is attached to vertical member 32 by strap 65. Since it is desirable to have no more interconnection terminals on the battery enclosure 24 than necessary, radio frequency energy may be coupled through transmission line 40 to positive terminal 62. The direct current component at terminal 62 may then be separated from the RF component in the transceiver. Those skilled in the art will recognize a number of ways to accomplish this. In one technique, the direct current component at terminal 62 may be fed through an inductor to the transceiver's fuse and on to the transceiver. If properly chosen, this inductor will prevent unacceptable levels of RF energy from interfering with the transceiver's bias networks. The RF signal may be delivered to or extracted from the antenna between the inductor and terminal 62. It may be desirable to capacitively couple the antenna to this terminal to avoid dc voltage on the antenna itself.

In the alternative, a separate 50 ohm connector may be provided to couple the Rf energy to and from the antenna structure. Those skilled in the art will recognize many ways to implement such a connector. In the preferred embodiment, however, one of the battery terminals also serves as an antenna terminal.

FIG. 3b shows a close-up view of the end 15 of transceiver 14 which is attachable to battery pack/antenna 22. Transceiver 14 includes electrical contacts 162 and 164 to which positive and negative battery contacts are coupleable as later described. In one embodiment of the invention, contact 162 is also coupled to an antenna input within transceiver 14. Many different structures may be employed to physically attach the battery pack/antenna 22 to transceiver 14 and the particular structure selected to perform this function is not important to the invention and thus is not shown in the drawings. One such structure which is conveniently employed to electrically and mechanically couple the battery pack/antenna 22 to transceiver 14 is described and claimed in U.S. Pat. No. 3,796,984 issued on Mar. 12, 1974 to George S. Selinko and assigned to Motorola, Inc. However, what is important is that electrical contacts 162 and 164 in transceiver 14 be mated with corresponding electrical contacts 62 and 64 of battery pack/antenna 22.

Figure 4:
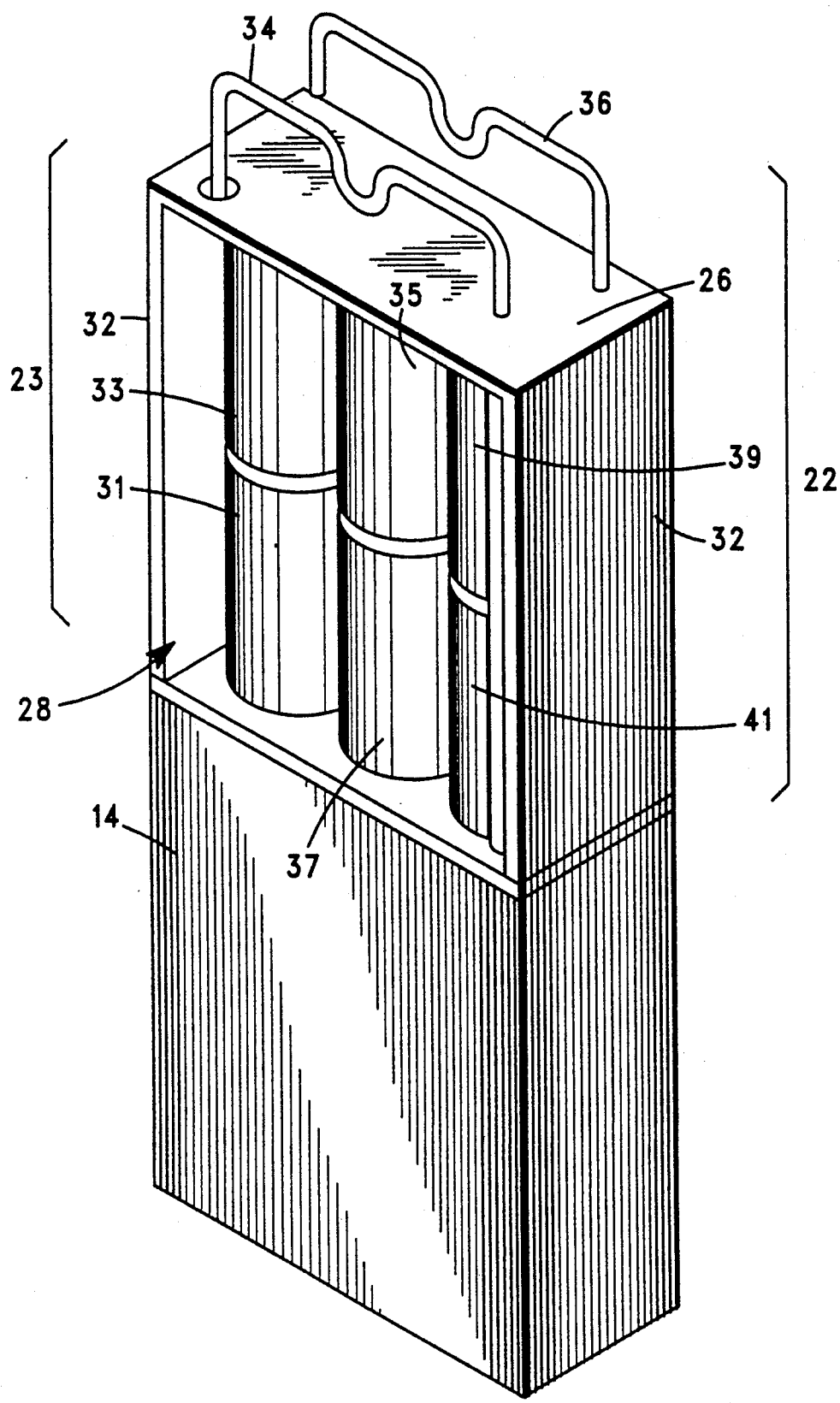
FIG. 4 is a perspective view of the battery/antenna structure of the invention showing battery cells situated within a counterpoise and forming a part thereof.

FIG. 4 is a representation of the battery pack/antenna 22 with enclosure 24 removed to show the actual battery cells 31, 33, 35, 37, 39 and 41 situated within the confines of battery compartment 28. Battery cells 31, 33, 35, 37, 39 and 41 together with horizontal conductive members 32 and vertical conductive member 26 form the counterpoise 23 of the antenna of the invention. In one embodiment of the invention, battery cells 31, 33, 35, 37, 39 and 41 are coupled together in a series combination to generate a supply voltage which is appropriate for the particular transceiver 14 which is to be coupled to battery pack/antenna 22. Connecting battery cells in series is well understood by those skilled in the art and thus is not illustrated. It is appreciated that such a series combination includes a positive electrode (not shown) which is coupled to battery contact 62, shown more clearly in FIG. 3a. It is also appreciated that such a series combination includes a negative electrode (not shown) which is coupled to battery contact 64, shown more clearly in FIG. 3a. For sake of convenience and clarity in FIG. 4, the connection of driven element 34 to electrical contact 62 is not shown.

FIG. 5 is an exploded view of battery pack/antenna 22 of the invention. FIG. 5 shows the relationship of enclosure 24 to the remainder of battery pack/antenna 22. It is seen that enclosure 24 substantially surrounds counterpoise portion 23, driven element 34 and parasitic element 36. Enclosure 24 includes a six sided substantially rectangular structure as illustrated. Enclosure 24 is fabricated of an electrically insulative material, preferably a high durability material such as polycarbonate. As seen in FIG. 5, enclosure 24 includes end cover portions 27 and 61B. End cover portion 61B includes apertures 82 and 84 through which battery contacts 62 and 64 protrude a sufficient distance to permit coupling with respective contacts 162 and 164 of transceiver 14.

The theory of the operation of this antenna structure as well as other salient features of this particular antenna structure are detailed in the above-referenced and incorporated U.S. Pat. No. 4,591,863, more fully. More complete information may be obtained by reference thereto.

Thus, it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A battery pack/antenna, comprising:
   an antenna for radiating energy;
   at least one energy storage means for providing a ground plane for said antenna; and
   an insulative housing containing at least said at least one energy storage means.

2. The battery pack/antenna of claim 1, wherein said at least one energy storage means comprises a portion of a parasitic element of said antenna.

3. The battery pack/antenna of claim 1, wherein said antenna includes a parasitic element and an active element for radiating energy.

4. The battery pack/antenna of claim 3, wherein said at least one energy storage means provides a portion of said parasitic element.

5. The battery pack/antenna of claim 1, wherein said at least one energy storage means comprises metal casing.

6. A battery pack/antenna, comprising:
   an antenna for radiating energy;
   a battery extending the length of said antenna for providing a portion of a ground plane for said antenna;
   a ground structure for providing another portion of said ground plane for said antenna; and
   an insulative housing containing said antenna, said battery, and said ground structure.

7. The battery pack/antenna of claim 6, further comprising antenna coupling means attached to an exterior surface of said housing for coupling energy into said housing from outside said housing.

8. The battery pack/antenna of claim 7, wherein said antenna coupling means comprises a terminal for coupling to said antenna and said battery.

9. The battery pack/antenna of claim 7, wherein said antenna coupling means comprises a terminal for coupling to said antenna.

10. A battery pack/antenna, comprising:
    an antenna for radiating energy;
    a battery extending the horizontal length of said antenna for providing a portion of a ground plane for said antenna, said battery having a positive electrode for coupling energy to said antenna;

a ground structure having a vertical length set at approximately one quarter wavelength of said antenna for providing another portion of said ground plane to enhance the performance of said antenna; and an insulative housing containing said antenna, said battery, and said ground structure, said housing having a positive electrical contact for coupling energy to said positive electrode of said battery.

11. The battery pack/antenna of claim 10, wherein said ground structure is coupled to a negative electrode of said battery.

12. A battery pack/antenna, comprising:

an antenna including a parasitic element and an active element for radiating energy;

at least one energy storage means for providing a portion of said parasitic element;

a ground structure for providing another portion of said parasitic element; and an insulative housing containing said antenna, said at least one energy storage means, and said ground structure.

13. A battery pack/antenna, comprising:

an antenna including a parasitic element and an active element for radiating energy;

a battery extending the length of said antenna for providing a portion of said parasitic element;

a ground structure for providing another portion of said parasitic element; and an insulative housing containing said antenna, said battery, and said ground structure.

14. A battery pack/antenna, comprising:

an antenna including a parasitic element and an active element for radiating energy;

a battery extending the length of said antenna for providing a portion of said parasitic element, said battery having a positive electrode for coupling energy to said antenna;

a ground structure for providing another portion of said parasitic element; and an insulative housing containing said antenna, said battery, and said ground structure, said housing having a positive electrical contact for coupling energy to said positive electrode of said battery.

* * * * *